US012745170B2

(12) United States Patent
Sharma et al.

(10) Patent No.: US 12,745,170 B2
(45) Date of Patent: Sep. 22, 2026

(54) COMMUNICATIONS DEVICE, INFRASTRUCTURE EQUIPMENT, CORE NETWORK EQUIPMENT AND METHODS

(71) Applicant: Sony Group Corporation, Tokyo (JP)

(72) Inventors: Vivek Sharma, Basingstoke (GB); Yuxin Wei, Basingstoke (GB); Hideji Wakabayashi, Basingstoke (GB); Yassin Aden Awad, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 645 days.

(21) Appl. No.: 17/918,134

(22) PCT Filed: Mar. 22, 2021

(86) PCT No.: PCT/EP2021/057280

§ 371 (c)(1),
(2) Date: Oct. 11, 2022

(87) PCT Pub. No.: WO2021/228458

PCT Pub. Date: Nov. 18, 2021

(65) Prior Publication Data

US 2023/0136928 A1 May 4, 2023

(30) Foreign Application Priority Data

May 11, 2020 (EP) .................................... 20173983

(51) Int. Cl.

*H04W 60/00* (2009.01)
*H04W 48/02* (2009.01)
*H04W 48/20* (2009.01)

(52) U.S. Cl.

CPC ........... *H04W 48/20* (2013.01); *H04W 48/02* (2013.01); *H04W 60/00* (2013.01)

(58) Field of Classification Search

CPC ...... H04W 48/20; H04W 48/02; H04W 60/00
See application file for complete search history.

(56) References Cited

U.S. PATENT DOCUMENTS 5,794,140 A * 8/1998 Sawyer ............. H04M 15/8083 455/406
9,603,022 B2 * 3/2017 Laarakkers ........... H04L 63/083
(Continued)

FOREIGN PATENT DOCUMENTS

CN 104521278 A 4/2015
CN 109964509 A 7/2019
(Continued)

OTHER PUBLICATIONS

International Search Report and Written Opinion mailed on Aug. 8, 2021, received for PCT Application PCT/EP2021/057280, filed on Mar. 22, 2021, 22 pages.

(Continued)

*Primary Examiner* — Steven S Kelley
(74) *Attorney, Agent, or Firm* — XSENSUS LLP

(57) ABSTRACT

A method of operating a communications device, the method comprising receiving broadcast information transmitted in a cell of the wireless communications network, based on the broadcast information, determining that a service is provided via the wireless communications network, selecting the cell of the wireless communications network as a serving cell, receiving an indication in the cell that registration for the service is permitted, receiving information associated with the service and determining that the service is not required, transmitting a rejection indication indicating that the service is not required and receiving a network restriction indication transmitted in response to the rejection indication, the network restriction indication indicating that the communications device is not permitted to select the cell as a serving cell.

8 Claims, 7 Drawing Sheets

(56) References Cited

U.S. PATENT DOCUMENTS

| | | | | |
|---|---|---|---|---|
| 11,006,274 | B2 * | 5/2021 | Chaponniere | H04W 76/25 |
| 2014/0033288 | A1 * | 1/2014 | Wynn | H04W 48/18 726/7 |
| 2015/0254726 | A1 * | 9/2015 | Cassidy | G06Q 50/12 705/14.58 |
| 2017/0171200 | A1 * | 6/2017 | Bao | H04L 9/3213 |
| 2019/0029065 | A1 | 1/2019 | Park | |
| 2019/0037475 | A1 * | 1/2019 | Zhang | H04W 76/10 |
| 2019/0230180 | A1 * | 7/2019 | Wang | G06F 16/252 |
| 2019/0230181 | A1 | 7/2019 | Wang | |
| 2019/0335392 | A1 * | 10/2019 | Qiao | H04W 48/16 |
| 2020/0092747 | A1 * | 3/2020 | Kumar | H04W 60/04 |

FOREIGN PATENT DOCUMENTS

| | | | | |
|---|---|---|---|---|
| JP | 2012511873 A | 5/2012 | | |
| JP | 2014110011 A | 6/2014 | | |
| WO | 2020/092801 A1 | 5/2020 | | |
| WO | WO-2020134329 A1 * | 7/2020 | | H04L 67/51 |

OTHER PUBLICATIONS

Nokia et al., "Revised SID: Study on NR Industrial Internet of Things (Iot)", 3GPP TSG RAN meeting #81, RP-182090, Sep. 10-13, 2018, 5 pages.

3GPP, "Procedures for the 5G System (5GS); Stage 2 (Release 16)", 3GPP TS 23.502, v 16.4.0, Mar. 2020, pp. 1-582.

3GPP, "NR; Radio Resource Control (RRC) protocol specification (Release 16)", 3GPP TS 38.331 V16.0.0, Mar. 2020, pp. 1-835.

Holma et al., "LTE for UMTS OFDMA and SC-FDMA Based Radio Access", John Wiley & Sons, 2009, pp. 25-27.

Qualcomm, "New Rel-18 Study proposal on Network as a Service", 3GPP TSG-SA WG1 Meeting #90-e, S1-202094, May 18-22, 2020, 9 pages.

* cited by examiner

COMMUNICATIONS DEVICE, INFRASTRUCTURE EQUIPMENT, CORE NETWORK EQUIPMENT AND METHODS

CROSS-REFERENCE TO RELATED APPLICATIONS

The present application is based on PCT filing PCT/EP2021/057280, filed Mar. 22, 2021, which claims priority to EP 20173983.6, filed May 11, 2020, the entire contents of each are incorporated herein by reference.

BACKGROUND

Field

The present disclosure relates to communications devices, infrastructure equipment, core network equipment and methods for operating communications devices, infrastructure equipment and core network equipment in a wireless communications network.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to support efficiently communications with devices including reduced complexity devices, machine type communication (MTC) devices, high resolution video displays, virtual reality headsets and so on. Some of these different types of devices may be deployed in very large numbers, for example low complexity devices for supporting the “The Internet of Things”, and may typically be associated with the transmissions of relatively small amounts of data with relatively high latency tolerance.

There is expected to be a desire for future wireless communications networks, for example those which may be referred to as 5 G or new radio (NR) system/new radio access technology (RAT) systems [1], as well as future iterations/releases of existing systems, to efficiently support different types of services. Some such services may be provided temporarily, on an ad-hoc basis, and/or without a pre-existing arrangement being in place between the service provider and a subscriber.

There is thus a need to provide techniques and equipment to allow a wireless communications network to effectively offer such services.

SUMMARY

The present disclosure can help address or mitigate at least some of the issues discussed above.

Example embodiments of the present technique can provide a method of operating a communications device in a wireless communications network, the method comprising receiving via a wireless access interface provided by an infrastructure equipment in a cell of the wireless communications network a registration accept indication, the registration accept indication indicating that the communications device is permitted to be registered for a service, determining that the service is not required, and in response to determining that the service is not required, transmitting a service rejection indication indicating that the service is not required.

Embodiments can provide access to dynamic services which may not be covered by a pre-existing arrangement, and can provide for the possibility for a communications device to indicate that it no longer requires (or requests) access to the service.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4 G)

Figure 1:
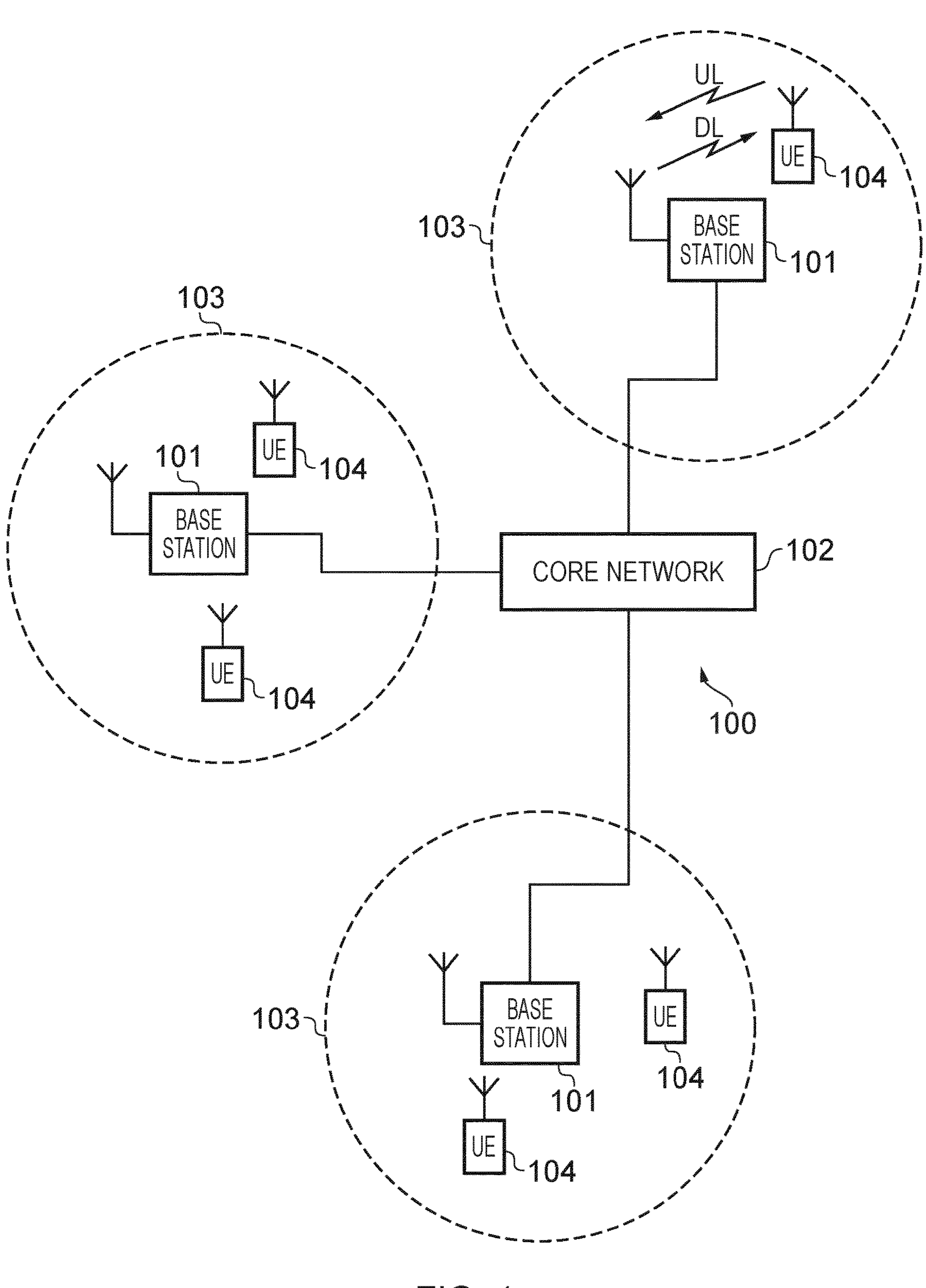
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5 G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5 G)

Figure 2:
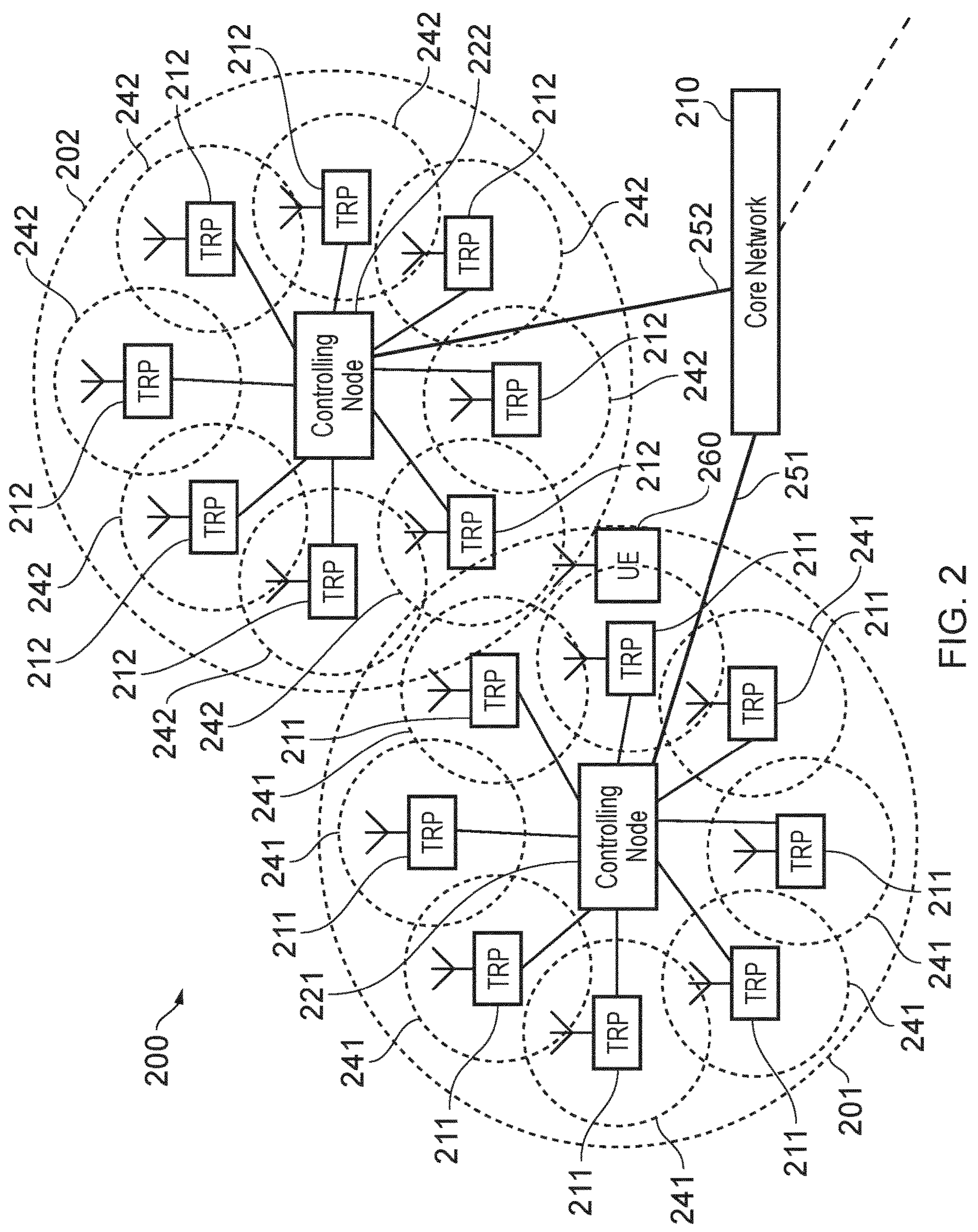
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at and the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
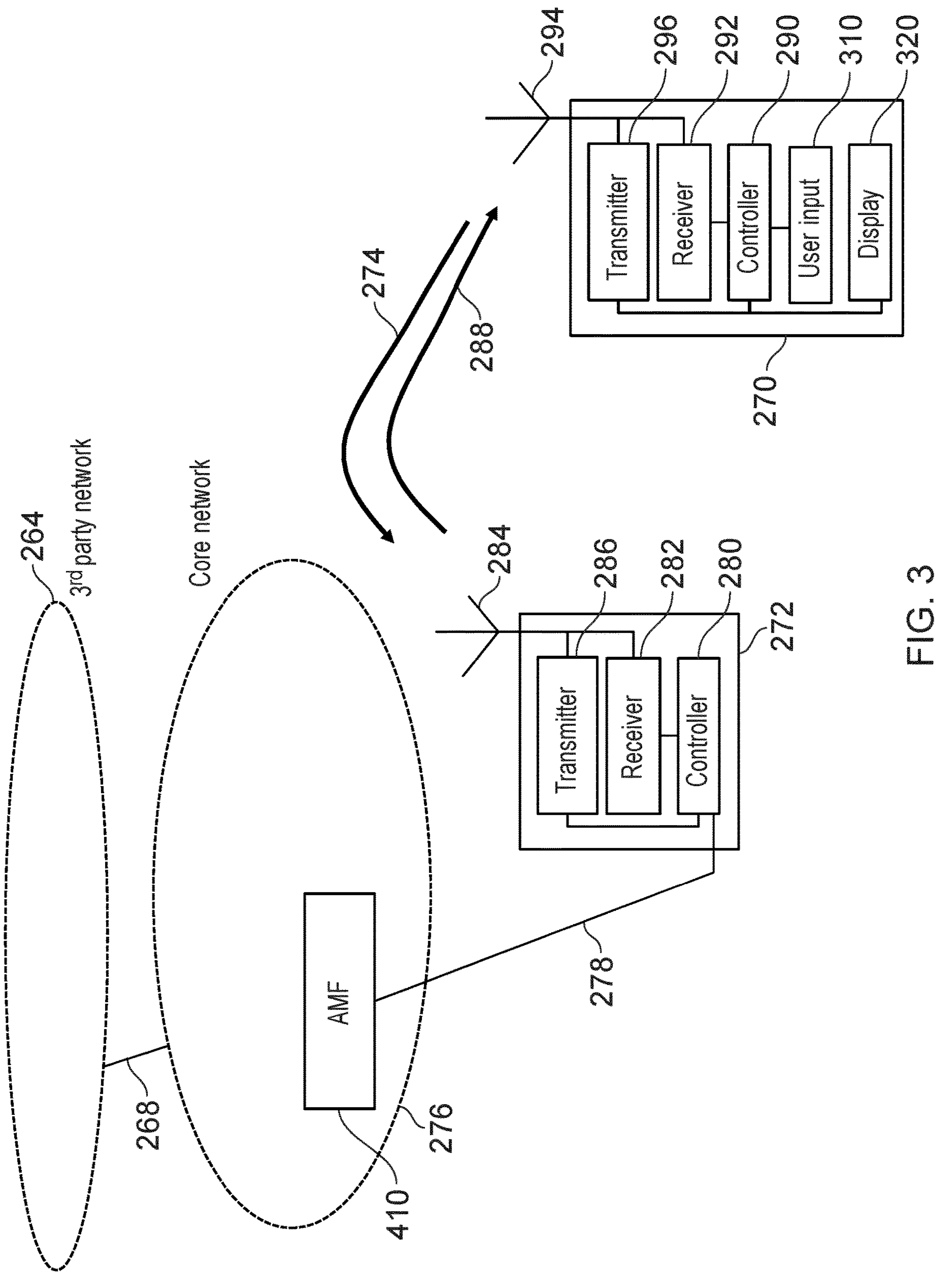
FIG. 3 is a schematic block diagram of an example infrastructure equipment and communications device which may be configured in accordance with example embodiments.

A more detailed illustration of a UE/communications device 270 (which may correspond to a communications device such as the communications device 260 of FIG. 2 or the communications device 104 of FIG. 1) and an example network infrastructure equipment 272, which may be thought of as an eNB 101 or a gNB (e.g. a combination of a controlling node 221 and TRP 211), is presented in FIG. 3. As shown in FIG. 3, the UE 270 is shown to transmit uplink data to the infrastructure equipment 272 via uplink resources of a wireless access interface as illustrated generally by an arrow 274 from the UE 270 to the infrastructure equipment 272. The UE 270 may similarly be configured to receive downlink data transmitted by the infrastructure equipment 272 via downlink resources as indicated by an arrow 288 from the infrastructure equipment 272 to the UE 270. As with FIGS. 1 and 2, the infrastructure equipment 272 is connected to a core network 276 via an interface 278 to a controller 280 of the infrastructure equipment 272.

The core network 276 may correspond to the core network part 102 of FIG. 1 or the core network component 210 of FIG. 2. The core network 276 provides connectivity to other networks, such as the packet data network 264 which may be operated independently of the wireless communications network.

For example, the packet data network 264 may provide access to the internet, or be operated by a service provider providing services to communications devices via the wireless communications network.

The core network 276 may comprise entities responsible for user plane communications and for control plane signalling. An example of a control plane entity is access and mobility management function (AMF) 410 shown in FIG. 3. Other entities may also be present in the core network 276.

The infrastructure equipment 272 includes a receiver 282 connected to an antenna 284 and a transmitter 286 connected to the antenna 284.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

The UE 270 includes a controller 290 connected to a receiver 292 which receives signals from an antenna 294 and a transmitter 296 also connected to the antenna 294. In some embodiments, the communications device/UE 270 comprises a user input 310, which may be a keyboard, a touch-sensitive panel, buttons or other known user input or combinations thereof.

In some embodiments, the communications device/UE 270 comprises a display 320, which may be an LED, OLED screen or other known display or combinations thereof.

The user input 310 and display 320 may be configured to be controlled by the controller 290.

The controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

The AMF 410 may comprise a processor, memory and one or more suitable communication interfaces. The processing steps described herein may be carried out by, for example, a microprocessor in conjunction with a random access memory, operating according to instructions stored on a computer readable medium.

The AMF 410 may comprise circuitry (such as a processor and associated memory), computer-readable medium having stored thereon a program comprising instructions to be carried out by the processor, and interface circuitry (e.g. transmitter and receiver circuitry) for transmitting and receiving control information from infrastructure equipment, entities in the packet data network and other core network entities.

It will be appreciated that the core network 276 may comprise more than one AMF, and may comprise other entities, such as those responsible for user plane functions.

Access to Services

Conventionally, access to services provided via a wireless communications network is in accordance with agreements made in advance between a subscriber and a service provider. For example, a subscriber may agree in advance to pay a certain amount for access to certain voice, data or other messaging services. The service provider similarly may provide in advance any relevant terms and conditions relating to the service(s). Any subscriptions can be associated in advance with a subscriber and such associations can be stored by a service provider such as an operator of the wireless communications network. A communications device may be associated with a subscriber (and hence a subscription) for example, by means of an inserted or embedded subscriber identity module, SIM, application. A communications device associated with the subscriber can thus obtain any subscribed services automatically (i.e. without further user interaction) based on the stored association between the subscriber and the subscription.

This conventional approach can also apply where a service is obtained from a service provider with whom the subscriber does not have a direct pre-existing relationship. For example, when a communications device operates in an area where service is not available via a network associated with a home network operator, service may be obtained via other network operators in accordance with a roaming agreement between the home network operator and the other network operator, and in accordance with roaming provisions (charges, terms and conditions and so forth) agreed in advance between the home network operator (with whom the subscriber has a relationship) and the subscriber.

Registration Procedure

Conventionally, access by a communications device to a service may be permitted or restricted by a wireless communications network, based on subscriber information associated with the communications device. In order to determine whether a communications device is permitted to access a service, the wireless communications network may confirm the identity of the subscriber associated with the communications device (i.e. perform authentication) and confirm whether the subscriber has an appropriate subscription allowing access to the service.

Figure 4:
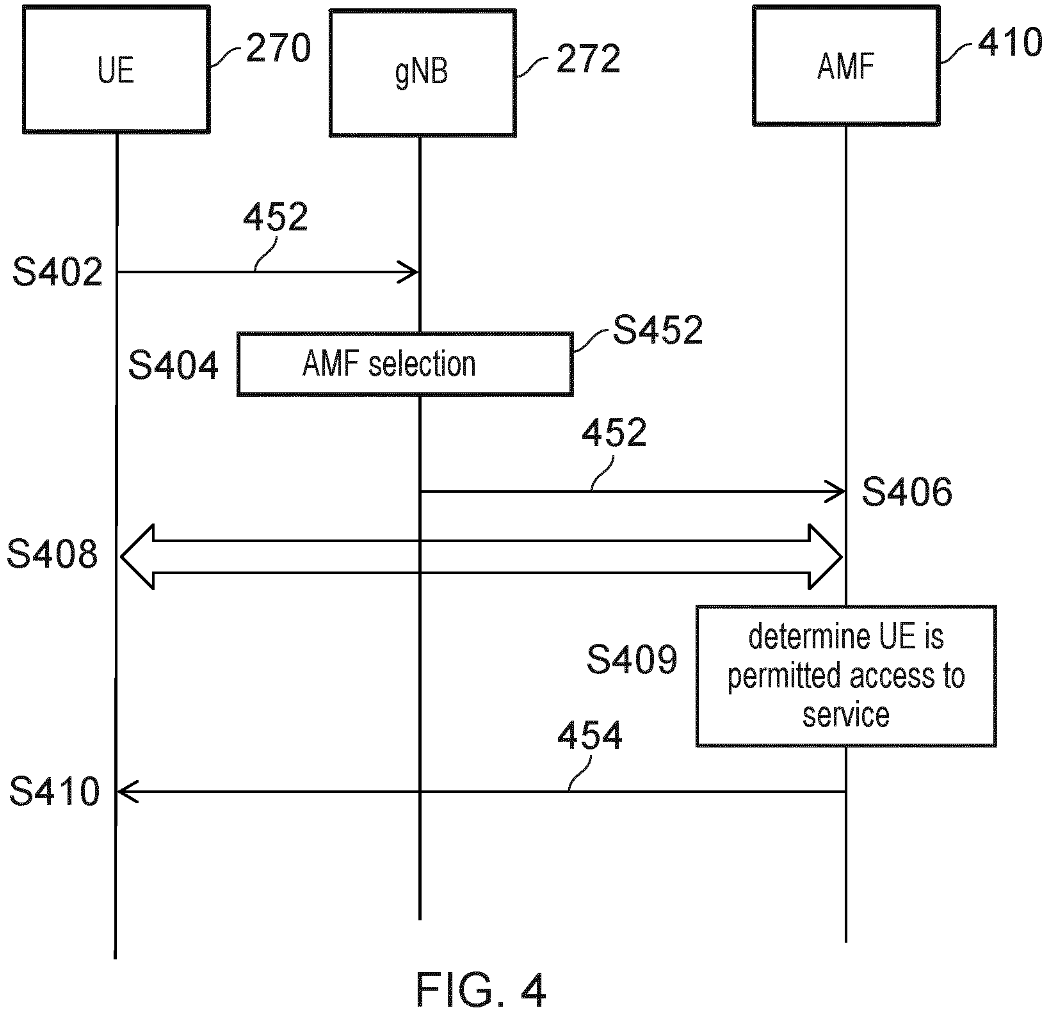
FIG. 4 is a combined process diagram/message sequence chart showing a simplified representation of a registration procedure according to conventional techniques.

FIG. 4 is a combined process diagram/message sequence chart showing a simplified representation of a registration procedure according to conventional techniques. The registration procedure may be considered as a determination by the wireless communications network of whether it is permitted for a communications device to obtain a requested service.

The registration procedure is a core network, or non-access stratum (NAS) procedure. In the sequence shown in FIG. 4, the communications device has already selected a serving cell and has initiated the establishment of an access stratum (AS) connection, such as a radio resource control (RRC) connection with the infrastructure equipment 272 of the wireless communications network.

Conventional algorithms for selecting a serving cell may comprise a first part in which a cell associated with a preferred wireless communications network. A preferred wireless communications network may be a ‘home’ network, such that the subscriber has a pre-existing commercial relationship with an operator providing services via the home network. A second part of the algorithm may ensure that, of the cells associated with the preferred network, a cell/frequency providing a better wireless access interface (e.g. having better radio quality and/or allowing for a higher data rate or lower error rate) is selected. These algorithms may be implemented, without user interaction, by the communications device. A preferred network may be a network which the communications device 270 is configured to consider as ‘equivalent’ to a home network. For example, networks having a PLMN ID which is configured as an equivalent PLMN ID (EPLMN ID) associated with the home PLMN ID may be preferred networks. In some embodiments, a network may be characterised by a standalone non-public network (SNPN) identity, or a Public Network Integrated Non-Public Network (PNI-NPN) identity.

At step S402, the communications device 270 transmits a registration request message 452 to the infrastructure equipment 272. The registration request message 452 may be contained within an RRC connection setup complete message (not shown). The registration request message 452 may comprise an indication of one or more requested services, which may comprise a list of requested protocol data unit PDU sessions. In some embodiments, the registration request message 452 may comprise a registration type indication. The registration type indication may indicate that the registration is being requested on a non-preferred network (e.g. not home PLMN) and/or that the registration is for a dynamic service. For example, the registration type indication may indicate that the registration is an initial registration on another network.

At step S404, the infrastructure equipment 272 selects an appropriate core network function to process the registration request message 452. In the example of FIG. 4, this is an access and management function (AMF), such as the AMF 410 shown in FIG. 3. Based on the selection, at step S406, the infrastructure equipment 272 forwards the registration request message 452 to the selected core network function, e.g. the AMF 410.

The AMF 410 may then acquire context information associated with the communications device 270 (not shown in FIG. 4). This may be from another AMF.

At step S408, security procedures (including authentication) are completed to confirm the identity of the subscriber associated with the communications device 270. These procedures may involve an Authentication Server Function (AUSF) (not shown in FIG. 4).

After satisfactory completion of the security procedures, at step S409 the AMF 410 determines that the communications device is associated with a subscription that permits access to the requested services.

At step S410, the AMF 410 transmits a registration accept message 454 to the communications device 270 via the infrastructure equipment 272. The registration accept message 454 may confirm that the communications device 270 is permitted to access one or more services and in this process one or more PDU sessions may also be set up.

Further details of a conventional registration procedure may be found in section 4.2.2 of [3].

Conventionally, when a registration procedure is required, the procedure shown in FIG. 4 follows directly and automatically from the initiation of the establishment of the connection with the infrastructure equipment 272.

Accordingly, conventionally, a communications device can automatically (and successfully) register for one or more services, using a preferred wireless communications network, in accordance with a pre-existing arrangement (e.g. subscription).

Network as a Service

It has been proposed [3] that services may be offered via wireless communications networks in a more dynamic manner. The term 'Dynamic services' is used herein to refer to those services which are not covered by a pre-existing direct or indirect agreement between a subscriber and the wireless communications network or service provider, or where any such pre-existing agreement may be supplemented at any time before the communications device obtains the service. For example, where pricing, availability, and/or nature of the services may be dynamic.

A dynamic service may be provided by a preferred network or by a non-preferred network.

The service may be provided subject to terms and conditions, which may relate to additional charges, privacy provisions, or other terms of use applicable to the service. The term 'terms and conditions' is used herein to refer to any such terms of use which may include, but may not be limited to, charges, obligations, and permissions.

In a scenario in which embodiments of the present technique may be applied, a content producer or a mobile operator may provide special contents only for those users who are inside a stadium and who agree to use this service. Providing this contents or on-demand service may require specific and dynamic QoS support, network/UE configuration and policies/provisioning.

The wireless communications network providing the service may be a 5 G network. The wireless communications network may support certain communications devices and services with specific quality of service (QoS)/policy requirements. The wireless communications network may configure communications devices and the network in order to set up a PDU session correctly.

The wireless communications network may provide ad hoc subscription/credentials to users, and available services.

The wireless communications network may be a public land mobile network (PLMN) or a non-public network (NPN). The wireless communications network may deploy a dedicated network slice for supporting this service and the service may be provided subject to specific charges.

The service may be provided by the operator of the wireless communications network or by a third party (for example, a sports team or stadium operator, a school or enterprise, shopping mall operators, and the like).

Figure 5:
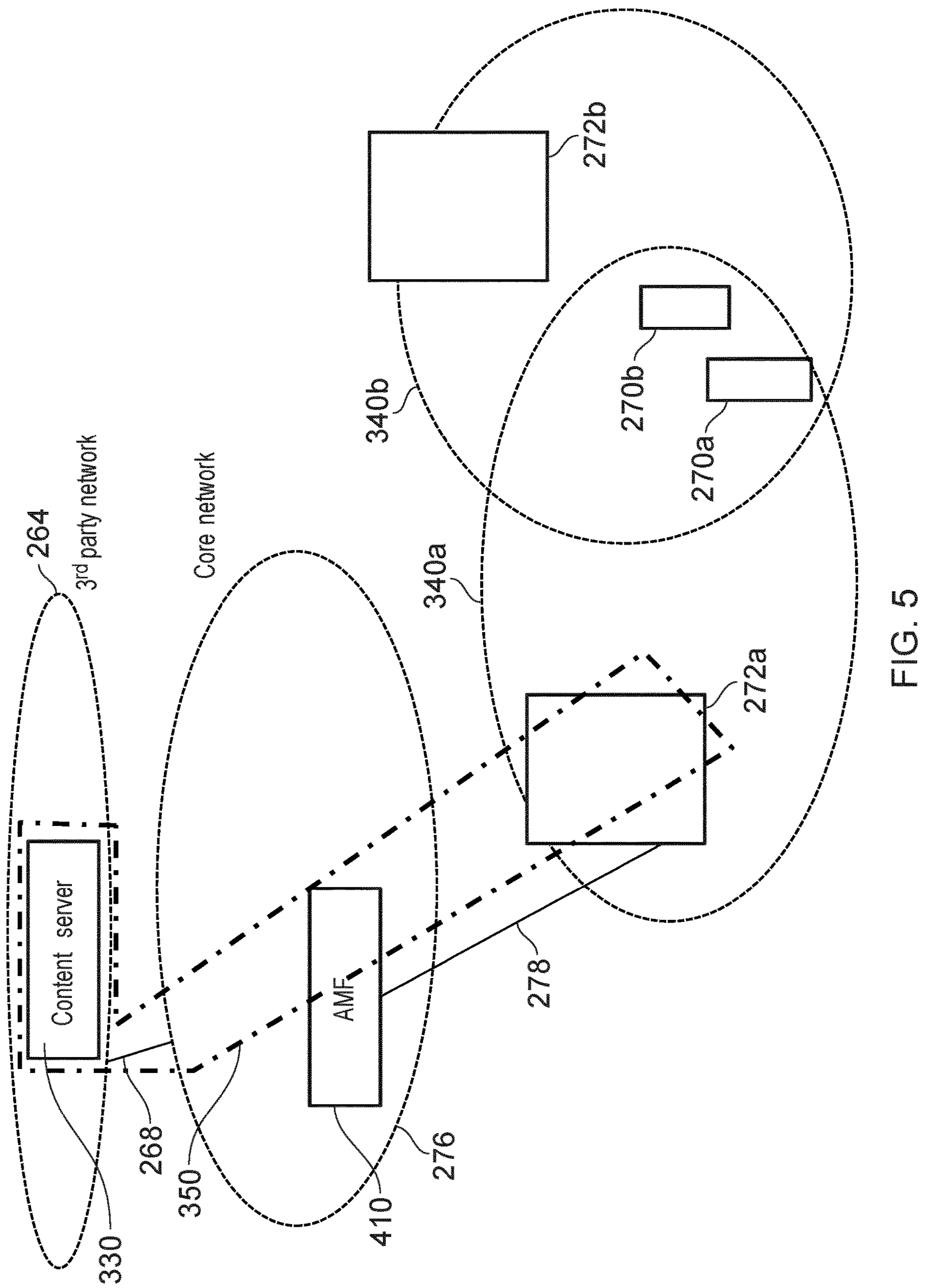
FIG. 5 schematically represents some aspects of wireless communications networks and communications devices which may be configured to operate in accordance with certain embodiments of the present disclosure.

FIG. 5 schematically represents some aspects of wireless communications networks and communications devices which may be configured to operate in accordance with certain embodiments of the present disclosure.

A first base station 272*a* (which may correspond to the infrastructure equipment 272 of FIG. 3) of a first wireless communications network provides a wireless access interface in a first cell 340*a* in the stadium (not shown in FIG. 5) in this example. The first base station 272*a* is connected to the core network 276 (which may be, for example, a 5 G core, 5GC network) of the wireless communications network and the core network 276 is connected to a content server 330. The content server 330 may physically reside in the stadium and be associated with a dedicated logical slice 350 configured in the wireless communications network. The slice 350 for this service may span parts of the core network 276, content server 330, first base station 272*a*, and portions of a transport network within the first wireless communications network. The functions described herein may be virtualized and physically reside at different places.

In the example of FIG. 5, coverage within the stadium is also provided by a second wireless communications network, comprising a second base station (infrastructure equipment) 272*b* providing a wireless access interface in a second cell 340*b*.

A first communications device 270*a* has as a preferred (e.g. home) wireless communications network the first wireless communications network. In accordance with conventional techniques, the first communications device 270*a* will preferentially select the first cell 340*a* as its serving cell. For example, the first communications device 270*a* may be associated with a subscription for accessing the first wireless communications network, and the first base station 272*a* may broadcast an identity (e.g. PLMN ID) associated with the first wireless communications network.

The first wireless communications network is not, however, preferred for a second communications device 270*b*. In accordance with conventional techniques, the second communications device 270*b* may preferentially select the second cell 340*b* as its serving cell. This may be because the second communications device 270*b* has as a preferred (e.g. home) wireless communications network the second wireless communications network. Because the first base station 272*a* does not broadcast an identity (e.g. PLMN ID or NPN ID) corresponding to a preferred wireless communications network of the second communications device 270*b*, the second communications device 270*b* does not select the first cell 340*a* as a serving cell.

However, it is desirable that the both the first communications device 270*a* and the second communications device 270*b* should be able to access the service provided by the content server 330 via the first wireless communications network.

As described above, conventional techniques allow for efficient registration for services where pre-existing arrangements exist. However, such conventional techniques are not well suited for registration for dynamic services. In particular, conventional techniques do not permit a communications device to access a service provided by a first wireless communications network, where a preferred wireless communications network of the communications device (which is not the first wireless communications network) is also accessible.

There is thus a need to provide procedures for a user to access such dynamic services.

Embodiments of the present technique provide a method a method of operating a communications device in a wireless communications network, the method comprising receiving via a wireless access interface provided by an infrastructure equipment in a cell of the wireless communications network a registration accept indication, the registration accept indication indicating that the communications device is permitted to be registered for a service, determining that the service is not required, and in response to determining that the service is not required, transmitting a service rejection indication indicating that the service is not required.

Embodiments of the present technique can provide for a communications device to receive an indication of a successful (or conditional) registration, the registration being associated with information which may comprise one or more terms and conditions, determining that at least one of the one or more terms and conditions is not acceptable, and in response, transmitting an indication that the service is not required.

Embodiments of the present technique can provide a method of operating a communications device, the service provided via a wireless communications network which, in accordance with a subscription associated with the communications device, is not a preferred communications network, the method comprising selecting a cell of the wireless communications network, receiving an indication that registration for the service is permitted, receiving information associated with the service and determining that the service is not required. The method may further comprise determining that the service is provided via the wireless communications network in response to receiving broadcast information transmitted in the cell of the wireless communications network. The method may further comprise transmitting a rejection indication that the service is not required and receiving a network restriction indication transmitted in response to the rejection indication, the network restriction indication indicating that the communications device is not permitted to select the cell as a serving cell. The service may be associated with a dedicated slice configured in the wireless communications network.

Figure 6:
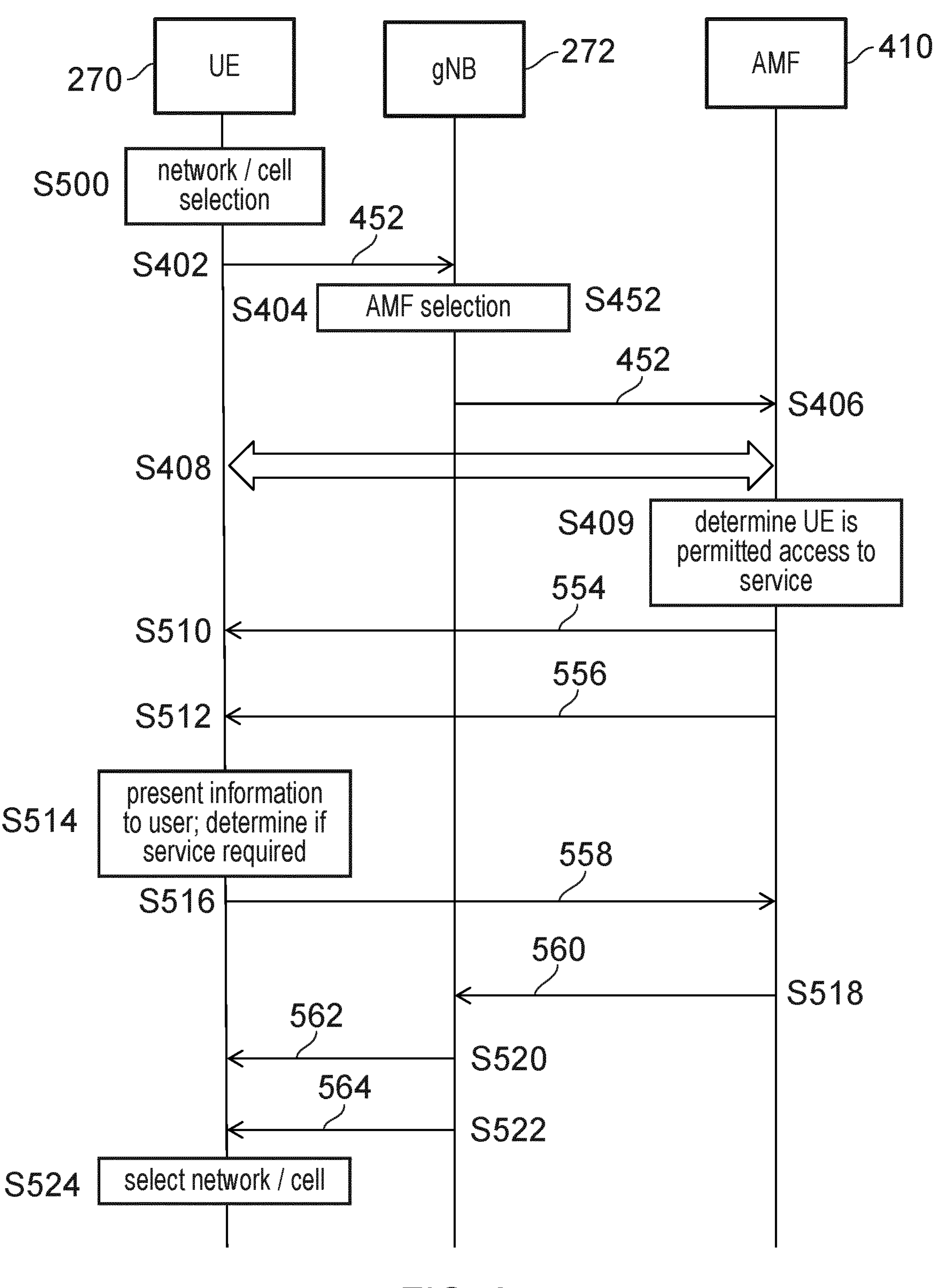
FIG. 6 is a combined process diagram/message sequence chart showing a registration procedure according to embodiments of the present technique.

FIG. 6 is a combined process diagram/message sequence chart showing a registration procedure according to embodiments of the present technique.

At step S500, the communications device 270 (which may correspond to the first communications device 270*a* or the second communications device 270*b* of FIG. 5) selects a serving cell.

In some embodiments, the serving cell is selected in accordance with conventional techniques such as conventional network (e.g. PLMN) selection and cell selection and reselection.

In some embodiments, the serving cell is selected from a selected network.

The selected network may be selected by a user and/or may be selected based on a determination that it offers a particular dynamic service. For example, a user may, through the user interface 310 indicate a desired service, and the selected network may be selected based on a determination by the communications device that it offers the desired service.

Selecting the network based on a determination that it offers the desired service may be based on broadcast information transmitted by the selected network and/or preconfigured information stored at the communications device.

In some example embodiments, the user may indicate a desired network, and the desired network is then selected. In some such embodiments, this may comprise the communications device receiving broadcast transmissions from cells associated with a plurality of different networks, presenting to the user an indication of two or more of the plurality of networks, and receiving a selection indication from the user indicating one of the presented networks.

Once the selected network is determined then a cell associated with that network is selected. Where the communications device is within a coverage area of multiple cells associated with the selected network, the selection of a cell may be based on one or more of measurements of received signals, preconfigured preferences, operating carrier frequencies of the cells, and radio access technologies used to provide the wireless access interface in each cell. This selection (and subsequent reselections) may be in accordance with conventional cell selection and reselection techniques.

The communications device 270 then initiates the establishment of a connection with the infrastructure equipment 272 providing the wireless access interface in the selected cell. The connection may be an RRC connection.

Step S402, as described above in the context of FIG. 4, may then occur subsequent to, or as part of the establishment of the connection with the infrastructure equipment 272. In some embodiments, the registration request message 452 transmitted at step S402 may comprise a request for a dynamic service and/or may also comprise an indication that the registration is from another network of the UE.

Steps S404 and S406, S408 and S409 may then proceed as described above in the context of the example of FIG. 4.

In some embodiments, the selection of the AMF at step S404 may be based on the dynamic service requested at step S402. For example, the selected AMF may be one associated with a network slice via which the dynamic service is provided. The network slice may be dedicated to the provision of the dynamic service.

In some embodiments, the determination at step S409 may be based on a pre-configuration or pre-authorisation of the communications device 270. For example, a pre-authorization may be carried out by an application running on the communications device 270 or any other user device which interacts with an application server (not shown). For example, in the scenario of FIG. 5, an application associated with the stadium may provide an option for the communications device to be pre-authorised to obtain the dynamic service. Accordingly, a user may accept applicable terms and conditions prior to step S402.

At step S510, a registration accept message 554 is transmitted to the communications device 272 from the core network entity (e.g. the AMF 410). The registration accept message 554 indicates that the communications device 272 is permitted to access the dynamic service. The permission may be conditional on the acceptance of certain terms and conditions.

At step S512, the communications device 270 receives information 556 associated with the dynamic service. The information 556 may comprise terms and conditions for using this service. The information 556 may include the charging information. In general, the information 556 may comprise any information on which a user or the communications device 270 may determine whether access the service is required.

In some embodiments, steps S512 and S510 are combined, for example by including the information 556 within the registration accept message 554 to form a combined registration accept message. In some embodiments, the combined registration accept message 554 may comprise up to 9000 bytes of non-access stratum layer information. The combined registration accept message 554 may be mapped to a single RRC message and hence to a single packet data convergence protocol (PDCP) service data unit (SDU). In some embodiments, the combined registration accept message 554 may be transmitted using more than one PDCP SDU. In some embodiments, the combined registration accept message 454 may be transmitted using a single RRC message which is segmented, for example in accordance with conventional techniques as defined in 3GPP Release 16 for segmenting RRC messages.

At step S514, the communications device 270 may present some or all of the information 556 to a user of the communications device. The information 556 may be converted to a human-readable format before being presented. The presentation may be on the display 320.

In some embodiments, no information 556 is received at the communications device 270. For example, in some embodiments where the communications device 270 was pre-authorized for access to the service, such as by means of an application, the communications device 270 may not receive the information 556. In some embodiments, the information 556 may be transmitted by the infrastructure equipment 272, but no presentation of the information is carried out.

The user may be given the opportunity to indicate whether or not they wish to access the service. This indication may be explicit (e.g. by selecting an option corresponding to accessing the service) or implicit (e.g. by failing to respond within a certain time period).

At step S514, the determination as to whether the service is to be accessed may be made partly or entirely automatically (i.e. without user interaction) by the communications device. An automatic determinations may be made based on the information 556. For example, the communications device 270 may be pre-configured to reject any service where access to the service is not free (i.e. results in an additional charge to the subscriber). Accordingly, the communications device 270 may determine that the service is not required, based on the information 556 indicating that a certain (non-zero) charge will be incurred if the communications device 270 accesses the service.

At the completion of step S514, the communications device 270 determines whether the service is in fact required. If the service is required, then the registration may be completed in a conventional manner (e.g. by the communications device 270 sending a registration complete message, not shown in FIG. 6).

In the example of FIG. 6, it is determined that the service is not required, based at least in part on an indication provided by a user of the communications device 270. In response to this determination, at step S516, a registration reject message 558 is transmitted by the communications device 270. In some embodiments, the registration reject message 558 is a NAS message which is forwarded transparently by the infrastructure equipment 272. In some embodiments, the registration reject message 558 is an access stratum message transmitted to the infrastructure equipment 272. In such embodiments, in response to receiving the registration reject message 558, the infrastructure equipment 272 transmits a corresponding message indicating the rejection to the core network, for example using a message transmitted using a conventional N3 interface.

In some embodiments, the information 556 may be transmitted from the core network using a user plane connection (e.g. dedicated radio bearer, DRB and/or a packet data unit, PDU, session) established for the transmission of user plane data to and from the communications device. In some such embodiments, the order of steps may be different so that the subsequent steps (step S512, step S514 and so on) of FIG. 6 may occur after the establishment of a PDU session. In some such embodiments, additional steps to terminate the DRB and/or PDU session may be initiated by the communications device 270, the infrastructure equipment 272 and/or the core network after step S516, if it is determined that the service is not required.

In some embodiments, part of the information 556 may be transmitted using broadcast messages, such as system information messages, which can be received by a communications device prior to establishing an RRC connection or otherwise in a different order than shown in FIG. 6. A further part of the information 556 may be transmitted using one or more unicast messages transmitted to the communications device 270 after the access stratum connection is established.

For example, in some embodiments, multiple portions of information each applicable to different categories of subscribers or communications devices may be transmitted via one or more broadcast messages. One or more subsequent unicast message(s) transmitted to the communications device 270 may indicate which category the communications device 270 is associated with. In some embodiments, additional information which is relevant to the communications device 270 may be transmitted in the unicast message(s). Accordingly, the communications device 270 may perform step S514 based on information which is transmitted in a broadcast manner and on information which is transmitted in a unicast (communications device-specific) manner. This may be, for example, by presenting to the user via the display the portion(s) of information associated with the category indicated in the unicast message(s).

In some embodiments, some or all of the information 556 may be encoded in accordance with ASCII encoding for characters.

In some embodiments, an amount of encoded information may be equal to or less than a maximum amount of encoded information that can be included within a single system information block (SIB) message. In some embodiments, the maximum amount of encoded information that can be included within a single broadcast system information block (SIB) message may be 2917 bits.

As described above, in the example of FIG. 6, it is determined that the service is not required. Based on the registration reject message 558 (or a corresponding indication generated by the infrastructure equipment 272), the core network (e.g. the AMF 410) determines that the communications device 270 is not permitted to, or does not require to, access the dynamic service.

In some embodiments, the communications device 270 may be nevertheless permitted to access other services via the wireless communications network. For example, the wireless communications network may be a preferred, or 'home' network and the communications device 270 (which may correspond to the first communications device 270*a* in FIG. 5) may be permitted to access other (e.g. 'static') services in accordance with pre-arranged terms and conditions. Alternatively, the wireless communications network may be a network where roaming to obtain services is permitted for the communications device.

Accordingly, in some embodiments (not shown in FIG. 6), the core network or a radio access network (RAN) node such as the infrastructure equipment 272 may transmit a further NAS or access stratum (AS) message indicating that the communications device is permitted to remain connected to the wireless communications network for accessing other services.

In some embodiments, in accordance with conventional principles, the other services which communications device may be permitted to access via the wireless communications network may include emergency call services. Permission applicable to these services may be subject to predetermined (e.g. specified) conditions, and may therefore not require an explicit permission by the network in advance. For example, the conditions may require that the communications device 270 is not within the coverage area of a preferred wireless communications network.

In embodiments where the communications device 270 is permitted to access one or more services via the wireless communications network, the communications device may maintain the RRC connection, and may in some embodiments transmit a further service request message as a NAS message, requesting access to one or more other services. The communications device may thus obtain the other services, while not accessing the dynamic service.

In some embodiments, the core network (e.g. the AMF 410) may transmit at step S518 a status message 560 to the infrastructure equipment 272. The status message 560 may indicate whether the communications device 270 is permitted to remain connected to the wireless communications network. As described above, in some examples, if the communications device 270 is permitted to access one or more services via the wireless communications network, the status message 560 may indicate that the communications device 270 is permitted to remain connected to the wireless communications network.

In some examples (as in the example of FIG. 6), the status message 560 indicates that the communications device 270 is not permitted to remain connected to the wireless communications network, or some part thereof. This may be in response to a determination at the core network that the communications device 270 is not permitted to access any service via the wireless communications network.

In some embodiments, when such a status message 560 is sent, the core network may also release any core network connection associated with the communications device.

In response to receiving the status message 560, then in the example of FIG. 6, at step S520, the infrastructure equipment 272 may transmit a network restriction indication 562 to the communications device 270 via dedicated (e.g. unicast) or broadcast signalling.

The infrastructure equipment 272 may also transmit at step S522 a release message 564, indicating that the RRC connection is released. This may be in response to determining based on the status message 560, that the communications device 270 is not permitted to remain in a connected mode in the current serving cell.

In some embodiments, steps S520 and S522 may be combined. For example, the network restriction indication 562 may be transmitted within the release message 564.

In response to receiving the release message 564, the communications device 270 enters an idle mode.

The network restriction indication 562 indicates that the communications device is to reselect a different wireless communications network and/or a different cell. The network restriction indication 562 may indicate that the communications device is not permitted to select certain cells. The certain cells may be characterised by one or more of a centre carrier frequency, a radio access technology, and a wireless communications network (e.g. based on a PLMN ID).

In some embodiments, the network restriction indication 562 indicates that the communications device 270 is not permitted to select, as a serving cell, any cell associated with the wireless communications network (e.g. as identified by its PLMN ID), irrespective of the radio access technology or carrier frequency associated with the cell.

In some embodiments, the network restriction indication 562 indicates that the communications device 270 is not permitted to select as a serving cell any cell having the same carrier frequency associated with the current serving cell.

In some embodiments, the restriction is not limited in time, that is, the communications device 270 is not permitted to select as a serving cell any cell associated with the wireless communications network, irrespective of the duration since the restriction indication 562 was received.

In some embodiments, the restriction is limited to a particular restriction duration since the restriction indication 562 was received. For example, in some embodiments, the restriction duration is equal to a validity period for system information, which may be in some embodiments three hours. In some embodiments, the restriction duration may be 48 hours. In some embodiments, the restriction duration may be 300 seconds.

In some embodiments, the restriction duration may be predetermined. In some embodiments, the restriction duration may be indicated in the restriction indication 562. In some such embodiments, the network may set the restriction duration based on a time period for which the dynamic service is to be provided, such that the restriction does not end while the dynamic service is still available. For example, the restriction duration may be a remaining duration for which the dynamic service will be available.

In a particular example, the network restriction indication 562 indicates that the communications device 270 is not permitted to select as a serving cell any cell having the same carrier frequency associated with the current serving cell for a restriction duration of 300 s. However, it will be appreciated that the combination of the nature of the restriction and its duration is not so limited, and the scope of the present disclosure is not limited to any particular combinations of restriction and duration.

In some embodiments, the network restriction indication 562 may comprise a deprioritisation indicator, which may comprise a deprioritisationType element which indicates whether the current frequency or radio access technology (RAT) is to be de-prioritised, and a deprioritisationTimer element, which indicates the period for which either the current carrier frequency or the current RAT is deprioritised. Here, the 'current' frequency or RAT corresponds to that of the current serving cell. In some embodiments, the deprioritisation indicator may be in accordance with a conventional deprioritisation indicator, such as defined in [4]. Examples of RATs may include 2G (GSM/GPRS/EDGE), 3 G (UMTS/HDPA), 4 G (LTE) and 5 G (NR).

In some embodiments, the deprioritisationTimer element may indicate one of a plurality of predetermined time periods, wherein one or more of the plurality of time periods is 180 minutes or greater.

In some embodiments, the deprioritisationType element may indicate one of a plurality of restriction types. In some embodiments, the plurality of restriction types includes a "network" type, which indicates that the deprioritisation applies to the entire wireless communications network, e.g. as characterised by a PLMN ID or an NPN ID.

In some embodiments, the plurality of restriction types includes a "network and frequency" type, which indicates that the deprioritisation applies to both the current network and the current frequency, such that the communications device is required to deprioritise all cells which are either associated with the current network or operate on the current frequency, or both.

The network restriction indication 562 may be generated by the infrastructure equipment 272. In some embodiments, the network restriction indication 562 is generated based on an indication from the core network, for example based on the status message 560 received from the AMF 410. In some embodiments, an indication from the core network may indicate one or more network-level (PLMN level) restrictions which are to apply to the communications device 270 (such as whether or not it is permitted to select a cell in the current PLMN).

In some embodiments, RAT and/or frequency restrictions indicated by the network restriction indication 562 may be determined by the infrastructure equipment 272 either based on local policies configured at the infrastructure equipment or based on information, such as the status message 560, received from the core network, or a combination of both.

The information received from the core network may comprise an indication of allowed (or prohibited) networks, based on identifiers of one or more PLMNs, NPNs, CAG and the like. This information may be common to all communications devices.

In some embodiments, the infrastructure equipment 272 may determine parameters of a allowed or prohibited wireless access interfaces based on the information received from the core network. For example, the infrastructure equipment may be pre-configured with a mapping from PLMN ID to one or more (radio access technology, frequency) pairs. Thus in some embodiments, the network restriction indication 562 may indicate one or more wireless access interface parameters corresponding to cells which are prohibited, the wireless access interface parameters determined based on the information received from the core network.

In some embodiments, the network restriction indication 562 is broadcast as system information. Accordingly, the communications device 270 may receive the network restriction indication 562 prior to step S514. In some such embodiments, when a communications device 270 determines that the service is not required, it may process the network restriction indication 562 in response to the determination at step S514.

Accordingly, embodiments can provide an appropriate network restriction based on parameters of a wireless access interface (e.g. frequency, technology) and/or based on network identifiers.

As described above, in the example of FIG. 6, the network restriction indication 562 indicates that the communications device 270 is not permitted to remain connected in the current serving cell.

Accordingly, at step S524, in response to receiving the network restriction indication 562, the communications device 270 selects as a serving cell a cell which is permitted according to the network restriction indication 562. For example, the communications device 270 may tune its receiver to one or more carrier frequencies which are not prohibited by the network restriction indication 562, and determine if it is within range of an infrastructure equipment providing a wireless access interface for a cell operating at each carrier frequency. For each detected wireless access interface/cell, the receiver may be configured to receive system information to obtain identity information associated with the cell, such as PLMN ID, and to measure signals received in the cell. Based on the identity information and/or signal measurements, the communications device may select a cell in accordance with conventional network and cell selection principles.

Embodiments of the present technique can therefore permit a communications device to determine that it is permitted to access a dynamic service and, after determining that it is permitted to access the dynamic service, to indicate to the network that access to the dynamic service is not required.

Embodiments of the present technique can also ensure that a communications device, which indicates to the network that access to the dynamic service is not required, selects a cell on which it is able to access one or more services.

In some embodiments, the communications device 270 refrains from selecting (i.e. bars) cells of a certain category for a certain duration. On the expiry of that duration, the communications device may again select the cell in which it was permitted access to, but did not require, the dynamic service (the 'dynamic service cell'). In some embodiments, the communications device may select the dynamic service cell in response to determining that it is permitted to do so, for example based on an indication transmitted via broadcast signalling in the dynamic service cell. The receipt of the broadcast information may be in response to determining that radio conditions associated with the wireless access interface in the dynamic service cell satisfy certain conditions, and/or in response to receiving assistance information transmitted in another cell which identifies the dynamic service cell. As an example, the assistance information transmitted in the other cell may comprise priority information indicating that a priority of the operating frequency of the dynamic service cell is higher than that of the operating frequency of the other cell.

The receipt of the broadcast information may also be in response to a manual selection in response to a user input by a user of the communications device.

In some embodiments, the communications device 270 may determine (e.g. some time after step S520) that the dynamic service is, or may be, required. For example, this determination may be made based on an input by the user, indicating that the user wishes, or may wish to access the dynamic service.

In such embodiments, in response to this determination, the communications device 270 may temporarily or permanently act as though no network restriction indication 562 had been received. In addition, the communications device 270 may perform measurements on frequencies other than that of the current serving cell, and may perform cell selection as described above at step S400. Accordingly, the process shown in FIG. 6 may be restarted.

Accordingly, embodiments of the present technique can permit a user or communications device to initially reject a service, but subsequently to determine that the service is required, and can permit the user to obtain the service after initially it was determined that it was not required. Embodiments can permit a user that has initially rejected a service in a dynamic service cell, and is consequently restricted from selecting the dynamic service cell, from subsequently selecting the dynamic service cell and obtaining the service, if required.

Figure 7:
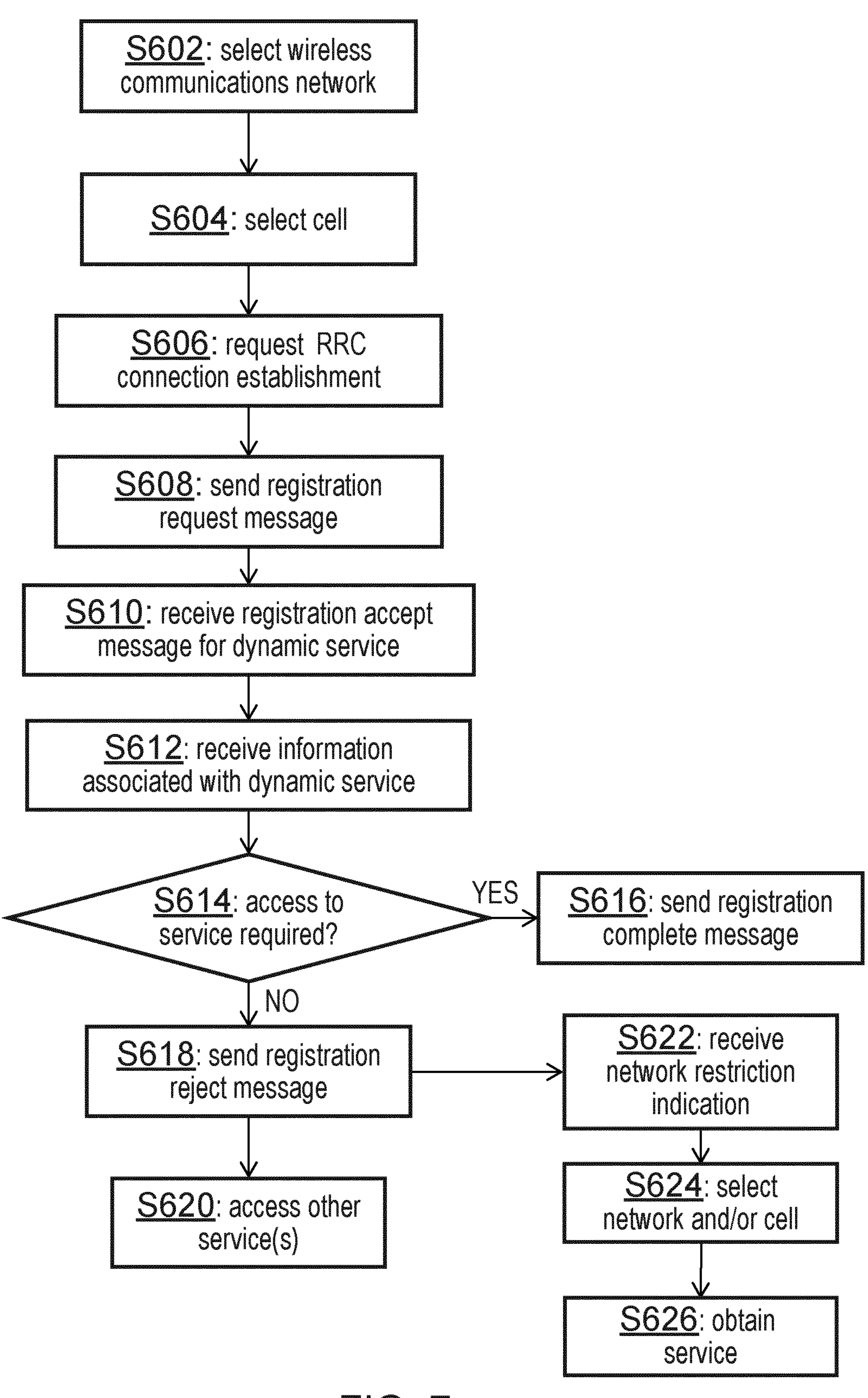
FIG. 7 shows a flow chart for a process for a communications device in accordance with embodiments of the present technique.

FIG. 7 shows a flow chart for a process for a communications device in accordance with embodiments of the present technique.

The process starts at step S602 in which the communications device (which may be the communications device 270) selects a wireless communications network. The wireless communications network may be characterised by a network identifier, such as a public land mobile network (PLMN) identity, PLMN ID, and/or NPN ID.

The selection of the wireless communications network may be in accordance with conventional techniques, such as automatic PLMN selection based on a home network associated with a subscription associated with the communications device. In some embodiments, the wireless communications network may be selected in response to user interaction. For example, the user may indicate a particular wireless communications network from which they wish to obtain a service and/or the user may indicate a particular service, and the wireless communications network is selected based on the indicated service.

At step S604, the communications device selects a serving cell of the selected wireless communications network. This step may be repeated if, for example, the communications device moves, so that it selects a new serving cell. This process of cell selection and reselection may be in accordance with conventional techniques, such as described in 3GPP TS 36.304.

The selection of the network and/or cell may be based on information received in another cell. For example, the communications device may receive information in another cell (such as broadcast system information) indicating that a dynamic service (such as one provided by a Network as a service provision) is available in a particular cell and/or via a particular network. Accordingly, the communications device may at step S602 and/or S604 select a network and/or cell based on the information received in the other cell.

At step S606, the communications device requests the establishment of a radio connection in the current serving cell. The request may be in accordance with a conventional technique for establishing a radio resource control connection.

At step S608, the communications device transmits a request to register for one or more services. The request may indicate specific services (including the dynamic service), or may request registration for all services which the wireless communications network determines that the communications device is permitted to access.

In some embodiments, step S608 may be carried out as part of step S606, for example by including the registration request message within a message, which also forms part of the radio connection establishment procedure. For example, in some embodiments, the registration request may be transmitted within an RRC Connection Setup Complete message.

In some embodiments, steps S604, S606, S608 may occur sequentially without user interaction.

At step S610, the communications device 270 receives a registration accept message. The registration accept message may indicate one or more services including the dynamic service which the communications device 270 is permitted to access via the wireless communications network.

At step S612, the communications device 270 receives information associated with a dynamic service, which the communications device 270 is permitted to access. The information may comprise terms and conditions. In some such embodiments, the registration accept message received at step S610 may indicate a conditional permission in respect of the dynamic service, access being permitted subject to the acceptance of the terms and conditions.

In some embodiments, steps S610 and S612 may be combined. For example, the information associated with the dynamic service may be received within the registration accept message.

At step S614, the communications device 270 determines whether access to the dynamic service is required. This may be based on predefined rules or configurations. For example, according to a predefined rule, the dynamic service is considered as not required if it results in an additional cost to the subscriber. As a further example, according to a predefined rule, all dynamic services are considered as not required. It will be appreciated that other examples of rules may apply, for example based on 'whitelists' and/or 'blacklists' of required and not required dynamic services.

In some embodiments, the determination is based on user interaction. The user indicates, by means of a user input (e.g. touch screen, keyboard) whether they wish to access the dynamic service. In some embodiments, some or all of the information received at step S612 is presented via a display to the user before the user indicates whether they wish to access the dynamic service.

Step S614 may correspond to the determination at step S514 of the process of FIG. 6 and described above.

If at step S614, it is determined that access to the dynamic service is required, then control passes to step S616.

At step S616, the communications device 270 indicates to the wireless communications network that it requires access to the dynamic service. This may be explicit or implicit. For example, in some embodiments, the communications device 270 transmits a registration complete message to the wireless communications network, indicating that the dynamic service is required. Accordingly, the communications device 270 accesses the dynamic service, which may be broadly provided in a conventional manner. An implicit indication may comprise an absence of an explicit indication that the communications device does not require access to the dynamic service.

If at step S614 it is determined that access to the dynamic service is not required (or, in some embodiments, if access to none of the permitted dynamic services is required) then control passes to step S618.

At step S618, the communications device 270 indicates to the wireless communications network that it does not require access to the dynamic service. This may be explicit or implicit. For example, in some embodiments, the communications device 270 transmits a registration reject message to the wireless communications network, indicating that the dynamic service is not required. An implicit indication may comprise an absence of an explicit indication that the communications device does require access to the dynamic service.

Following step S618, in some embodiments, control passes to step S620. In some such embodiments, the wireless communications network may be a preferred wireless communications network (e.g. a home network) and/or may provide access to services other than the dynamic service. At step S620, the communications device accesses one or more other services provided via the wireless communications network. These may include services which are not dynamic (e.g. are the subject of pre-existing arrangements).

In other embodiments, control passes to step S622. At step S622, the communications device 270 receives an network restriction indication, which may correspond to the network restriction indication 562 shown in FIG. 6 and described above. As described above, the network restriction indication generally indicates that the communications device is to reselect a different wireless communications network and/or a different cell and may indicate particular constraints on the subsequent cell and/or network selection.

After step S622, control passes to step S624. At step S624, the communications device 270 performs network and/or cell selection in accordance with the network restriction indication.

In some embodiments, control may pass to either step S620 or step S622. For example, if the communications device is permitted to access at least one service which is not dynamic via the wireless communications network, then control may pass to step S620. If the communications device is not permitted to access any service which is not dynamic via the wireless communications network, then control may pass to step S622. The determination as to whether the process continues with step S622 or step S620 may be made by the wireless communications network in response to receiving the indication at step S618.

In some embodiments, the process ends at step S620 or step S626.

In some embodiments, if the communications device 270 determines that the dynamic service is required, and that the communications device 270 is not able to access the service because of the restriction on network and/or cell selection, then the communications device 270 may perform network and/or cell selection to select a cell from which the dynamic service can be obtained, irrespective of the network restriction indication received at step S622. Following such a selection, the process may continue with step S606.

In some embodiments, step S618 may be omitted.

For example, in some embodiments, in response to determining at step S614 that the service is not required, the process continues with step S624. In some such embodiments, the selection of the network and/or cell at step S624 may be in accordance with a predetermined network restriction and/or a network restriction indication transmitted via broadcast signalling.

Accordingly, in some embodiments, referring to the example of FIG. 6, steps S516 and S518 may be omitted. Step S520 may be omitted, or may be performed by means of broadcast signalling and may be performed at a different time relative to the other steps shown in FIG. 6.

Accordingly, embodiments of the present technique can avoid signalling (e.g. of registration reject messages) generated in response to a communications device determining that it does not require access to a service.

In some embodiments, the information associated with the dynamic service may comprise network restriction information for use at step S624. This information may be broadcast.

In some embodiments, one or more of the steps or messages in FIG. 6 or FIG. 7 may be omitted or modified, and the steps may be performed in a different order. For example, in some embodiments, the determination at step S614 is made without user interaction. In some embodiments, one or more of the indications may be implicit. For example, step S606 may imply a request for registration for services, in which case step S608 may be omitted.

In some embodiments, for example, one or more of steps S606, S608, S610 may be omitted.

As described above, step S612 may, for example, occur prior to step S610.

It will be appreciated that in some embodiments, aspects of steps shown in FIG. 6 and described in the context of FIG. 6 may be applicable in corresponding steps of the process shown in FIG. 7, and vice versa.

The present disclosure is not limited to the specific combinations of features disclosed in respect of the various examples described above. In some embodiments, aspects of the examples may be combined in different ways.

In the examples described above, the user interaction is with the communications device 270 via a user input 310 and a display 320. However, the present disclosure is not so limited. The user interaction may be remote (e.g. via a user interface of a device communicatively connected to the communications device). The user input may be by tactile methods (e.g. keyboard, touch screen) or by other methods, e.g. speech input. Similarly, the presentation of information may be by means of audio representation (e.g. by speech synthesis) or any other suitable manner.

Accordingly, embodiments of the present technique can provide a method of operating a communications device in a wireless communications network, the method comprising receiving via a wireless access interface provided by an infrastructure equipment in a cell of the wireless communications network a registration accept indication, the registration accept indication indicating that the communications device is permitted to be registered for a service, determining that the service is not required, and in response to determining that the service is not required, transmitting a service rejection indication indicating that the service is not required.

There has also been described a method of operating a communications device in a wireless communications network, the method comprising receiving, via a wireless access interface provided by an infrastructure equipment in a cell of the wireless communications network, information associated with a service accessible via the cell, receiving a network restriction indication, the network restriction indication indicating a category of cells, the category of cells including the cell of the wireless communications network, determining that the service is not required, and in response to determining that the service is not required, selecting a cell in accordance with the network restriction indication.

There has also been described a method of operating a communications device, the method comprising receiving broadcast information transmitted in a cell of the wireless communications network, based on the broadcast information, determining that a service is provided via the wireless communications network, selecting the cell of the wireless communications network as a serving cell, receiving an indication in the cell that registration for the service is permitted, receiving information associated with the service and determining that the service is not required, transmitting a rejection indication indicating that the service is not required and receiving a network restriction indication transmitted in response to the rejection indication, the network restriction indication indicating that the communications device is not permitted to select the cell as a serving cell.

There has also been described a method of operating an infrastructure equipment in a wireless communications network, the method comprising transmitting via a wireless access interface provided by the infrastructure equipment in a cell of the wireless communications network a registration accept indication, the registration accept indication indicating that a communications device is permitted to be registered for a service, and receiving a service rejection indication indicating that the service is not required.

There has also been described a method of operating a core network entity in a wireless communications network, the method comprising determining that a communications device is permitted to access a service via the wireless communications network, determining that the communications device does not require access to the service, and in response to determining that the communications device does not require access to the service, transmitting a network restriction indication to an infrastructure equipment, the network restriction indication indicating whether the communications device is permitted to select as a serving cell a cell of the wireless communications network.

Corresponding apparatus, communications devices, infrastructure equipment, core network entities and circuitry have also been described.

It will be appreciated that while the present disclosure has in some respects focused on implementations in an LTE-based and/or 5 G network for the sake of providing specific examples, the same principles can be applied to other wireless telecommunications systems. Thus, even though the terminology used herein is generally the same or similar to that of the LTE and 5 G standards, the teachings are not limited to the present versions of LTE and 5 G and could apply equally to any appropriate arrangement not based on LTE or 5 G and/or compliant with any other future version of an LTE, 5 G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device.

It will further be appreciated that the principles described herein are applicable not only to LTE-based or 5 G/NR-based wireless telecommunications systems, but are applicable for any type of wireless telecommunications system that supports multiple services.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device in a wireless communications network, the method comprising receiving via a wireless access interface provided by an infrastructure equipment in a cell of the wireless communications network a registration accept indication, the registration accept indication indicating that the communications device is permitted to be registered for a service, determining that the service is not required, and in response to determining that the service is not required, transmitting a service rejection indication indicating that the service is not required.

Paragraph 2. A method according to paragraph 1, the method comprising: receiving, via the wireless access interface, information associated with the service, wherein the determining that the service is not required is based on the information.

Paragraph 3. A method according to paragraph 2, wherein the information associated with the service and the indication that the communications device is permitted to be registered for the service are received within a same message.

Paragraph 4. A method according to paragraph 2, wherein the information associated with the service is received within one or more broadcast messages.

Paragraph 5. A method according to any of paragraphs 2 to 4, wherein the information comprises one or more of terms and conditions applicable to the use of the service.

Paragraph 6. A method according to any of paragraphs 2 to 5, wherein determining based on the information that the service is not required comprises presenting the information to a user of the communications device, and receiving an input from the user indicating that the service is not required.

Paragraph 7. A method according to paragraph 6, wherein the input from the user indicates that the one or more of terms and conditions applicable to the use of the service are not acceptable to the user.

Paragraph 8. A method according to any of paragraphs 1 to 7, the method comprising transmitting a registration request, the registration request requesting that the communications device be registered for the service provided via the wireless communications network, wherein the indication that the communications device is permitted to be registered for the service is transmitted in response to the registration request.

Paragraph 9. A method according to paragraph 8, wherein the registration request comprises a registration type indication.

Paragraph 10. A method according to paragraph 8 or paragraph 9, the method comprising before transmitting the registration request, transmitting a radio resource control (RRC) connection request via the wireless access interface, wherein the registration request is transmitted within a message associated with the RRC connection.

Paragraph 11. A method according to paragraph 10 wherein the message associated with the RRC connection is an RRC connection setup complete message.

Paragraph 12. A method according to any of paragraphs 1 to 11, wherein the service rejection indication indicating that the service is not required is transmitted to an entity of a core network using a control plane and before a user plane connection to the core network is established.

Paragraph 13. A method according to any of paragraphs 1 to 12, the method comprising receiving a network restriction indication, the network restriction indication indicating a category of cells, the category of cells including the cell of the wireless communications network, and selecting a cell in accordance with the network restriction indication.

Paragraph 14. A method according to paragraph 13, wherein the communications device is prohibited from selecting as a serving cell any cell within the category of cells.

Paragraph 15. A method according to paragraph 13, wherein the communications device is to deprioritize for selecting as a serving cell any cell within the category of cells.

Paragraph 16. A method according to any of paragraphs 13 to 15, wherein the wireless access interface is characterised by a carrier frequency, and the category of cells comprises all cells characterised by the carrier frequency.

Paragraph 17. A method according to any of paragraphs 13 to 16, wherein the wireless access interface is provided in accordance with a radio access technology, and the category of cells comprises all cells associated with the wireless communications network whose wireless access interface is provided in accordance with the radio access technology.

Paragraph 18. A method according to any of paragraphs 13 to 17, wherein the category of cells comprises all cells associated with the wireless communications network.

Paragraph 19. A method according to any of paragraphs 13 to 18, wherein network restriction indication indicates a duration for which the network restriction indication applies.

Paragraph 20. A method according to any of paragraphs 1 to 19, the method comprising receiving a connection release indication indicating that a connection in a current serving cell is to be released.

Paragraph 21. A method according to any of paragraphs 1 to 12, the method comprising obtaining via the wireless access interface another service.

Paragraph 22. A method according to any of paragraphs 1 to 21, wherein the communications device is associated with a preferred wireless communications network, and the wireless communications network is not the preferred wireless communications network.

Paragraph 23. A method according to any of paragraphs 1 to 22, the method comprising determining that the service is available via the wireless communications network, and based on the determining that the service is available via the wireless communications network, selecting the cell.

Paragraph 24. A method according to any of paragraphs 1 to 23, wherein the registration accept indication indicates that the communications device is registered for the service.

Paragraph 25. A method according to any of paragraphs 1 to 23, wherein the registration accept indication indicates that the communications device is conditionally registered for the service.

Paragraph 26. A method according to any of paragraphs 1 to 25, wherein the service is a dynamic service.

Paragraph 27. A method according to paragraph 26, wherein the service is provided temporarily.

Paragraph 28. A method according to any of paragraphs 1 to 27, wherein the service is provided via a dedicated slice configured in the wireless communications network.

Paragraph 29. A method of operating a communications device in a wireless communications network, the method comprising receiving, via a wireless access interface provided by an infrastructure equipment in a cell of the wireless communications network, information associated with a service accessible via the cell, receiving a network restriction indication, the network restriction indication indicating a category of cells, the category of cells including the cell of the wireless communications network, determining that the service is not required, and in response to determining that the service is not required, selecting a cell in accordance with the network restriction indication.

Paragraph 30. A method of operating a communications device, the method comprising receiving broadcast information transmitted in a cell of the wireless communications network, based on the broadcast information, determining that a service is provided via the wireless communications network, selecting the cell of the wireless communications network as a serving cell, receiving an indication in the cell that registration for the service is permitted, receiving information associated with the service and determining that the service is not required, transmitting a rejection indication indicating that the service is not required and receiving a network restriction indication transmitted in response to the rejection indication, the network restriction indication indicating that the communications device is not permitted to select the cell as a serving cell.

Paragraph 31. A method according to paragraph 30, wherein in accordance with a subscription associated with the communications device, the wireless communications network is not a preferred communications network.

Paragraph 32. A method according to paragraph 30 or paragraph 31, provided via a dedicated slice of a wireless communications network Paragraph 33. A method of operating an infrastructure equipment in a wireless communications network, the method comprising transmitting via a wireless access interface provided by the infrastructure equipment in a cell of the wireless communications network a registration accept indication, the registration accept indication indicating that a communications device is permitted to be registered for a service, and receiving a service rejection indication indicating that the service is not required.

Paragraph 34. A method according to paragraph 33, the method comprising receiving from a core network entity of the wireless communications network the registration accept indication.

Paragraph 35. A method according to paragraph 34, wherein the registration accept indication is within a non-access stratum message.

Paragraph 36. A method according to any of paragraphs 33 to 35, the method comprising transmitting, via the wireless access interface, information associated with the service.

Paragraph 37. A method according to any of paragraphs 33 to 36, the method comprising receiving from the communications device a registration request, the registration request requesting that the communications device be registered for the service provided via the wireless communications network, wherein the indication that the communications device is permitted to be registered for the service is transmitted in response to the registration request.

Paragraph 38. A method according to paragraph 37, the method comprising before receiving the registration request, receiving a radio resource control (RRC) connection request via the wireless access interface from the communications device, wherein the registration request is transmitted within a message associated with the RRC connection.

Paragraph 39. A method according to any of paragraphs 33 to 38, the method comprising transmitting to the communications device a first network restriction indication, the network restriction indication indicating a category of cells, the category of cells including the cell of the wireless communications network.

Paragraph 40. A method according to paragraph 39, the method comprising receiving from the core network entity a second network restriction indication, wherein the first network indication is generated based on the second network restriction indication.

Paragraph 41. A method according to any of paragraphs 33 to 40, the method comprising in response to receiving the service rejection indication, transmitting an indication to a core network entity of the wireless communications network indicating that the service is not required.

Paragraph 42. A method according to paragraph 41, wherein transmitting the indication to the core network entity comprises forwarding the service rejection indication to the core network entity.

Paragraph 43. A method of operating a core network entity in a wireless communications network, the method comprising determining that a communications device is permitted to access a service via the wireless communications network, determining that the communications device does not require access to the service, and in response to determining that the communications device does not require access to the service, transmitting a network restriction indication to an infrastructure equipment, the network restriction indication indicating whether the communications device is permitted to select as a serving cell a cell of the wireless communications network.

44. A method according to paragraph 43, the method comprising in response to determining that the communications device is permitted to access the service via the wireless communications network, transmitting information associated with the service to an infrastructure equipment for transmitting to the communications device.

Paragraph 45. A method according to paragraph 43 or paragraph 44, the method comprising determining that the service is a dynamic service.

Paragraph 46. A method according to paragraph 45, wherein the transmitting the network restriction indication is in response to determining that the service is a dynamic service.

Paragraph 47. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to receive via the wireless access interface a registration accept indication, the registration accept indication indicating that the communications device is permitted to be registered for a service, to determine that the service is not required, and in response to determining that the service is not required, to transmit a service rejection indication indicating that the service is not required.

Paragraph 48. A communications device for operating in a wireless communications network, the communications device comprising a transmitter configured to transmit signals via a wireless access interface provided by an infrastructure equipment in a cell of the wireless communications network, a receiver configured to receive signals via the wireless access interface, and a controller configured to control the transmitter and the receiver so that the communications device is operable: to receive via the wireless access interface a registration accept indication, the registration accept indication indicating that the communications device is permitted to be registered for a service, to determine that the service is not required, and in response to determining that the service is not required, to transmit a service rejection indication indicating that the service is not required.

Paragraph 49. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to receive, via the wireless access interface, information associated with a service accessible via the cell, to receive a network restriction indication, the network restriction indication indicating a category of cells, the category of cells including the cell of the wireless communications network, to determine that the service is not required, and in response to determining that the service is not required, to select a cell in accordance with the network restriction indication.

Paragraph 50. A communications device for operating in a wireless communications network, the communications device comprising a transmitter configured to transmit signals via a wireless access interface provided by an infrastructure equipment in a cell of the wireless communications network, a receiver configured to receive signals via the wireless access interface, and a controller configured to control the transmitter and the receiver so that the communications device is operable: to receive, via the wireless access interface, information associated with a service accessible via the cell, to receive a network restriction indication, the network restriction indication indicating a category of cells, the category of cells including the cell of the wireless communications network, to determine that the service is not required, and in response to determining that the service is not required, to select a cell in accordance with the network restriction indication.

Paragraph 51. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to receive broadcast information transmitted in the cell, based on the broadcast information, to determine that a service is provided via the wireless communications network, to select the cell of the wireless communications network as a serving cell, to receive an indication in the cell that registration for the service is permitted, to receive information associated with the service and to determine that the service is not required, to transmit a rejection indication indicating that the service is not required and to receive a network restriction indication transmitted in response to the rejection indication, the network restriction indication indicating that the communications device is not permitted to select the cell as a serving cell.

Paragraph 52. A communications device for operating in a wireless communications network, the communications device comprising a transmitter configured to transmit signals via a wireless access interface provided by an infrastructure equipment in a cell of the wireless communications network, a receiver configured to receive signals via the wireless access interface, and a controller configured to control the transmitter and the receiver so that the communications device is operable: to receive broadcast information transmitted in the cell, based on the broadcast information, to determine that a service is provided via the wireless communications network, to select the cell of the wireless communications network as a serving cell, to receive an indication in the cell that registration for the service is permitted, to receive information associated with the service and to determine that the service is not required, to transmit a rejection indication indicating that the service is not required and to receive a network restriction indication transmitted in response to the rejection indication, the network restriction indication indicating that the communications device is not permitted to select the cell as a serving cell.

Paragraph 53. Infrastructure equipment for use in a wireless communications network, the infrastructure equipment providing a wireless access interface for communicating with a communications device in a cell, the infrastructure equipment comprising a transmitter configured to transmit signals to the communications device via the wireless access interface, a receiver configured to receive signals from the communications device, and a controller configured to control the transmitter and the receiver so that the infrastructure equipment is operable to transmit via the wireless access interface in a cell of the wireless communications network a registration accept indication, the registration accept indication indicating that the communications device is permitted to be registered for a service, and to receive a service rejection indication indicating that the service is not required.

Paragraph 54. Circuitry for an Infrastructure equipment for use in a wireless communications network, the infrastructure equipment providing a wireless access interface for communicating with a communications device in a cell, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable to transmit via the wireless access interface in a cell of the wireless communications network a registration accept indication, the registration accept indication indicating that the communications device is permitted to be registered for a service, and to receive a service rejection indication indicating that the service is not required.

Paragraph 55. Apparatus for operating as a core network entity for a wireless communications network, the apparatus comprising memory and a processor, the memory having stored thereon computer readable instructions, which when executed, cause the apparatus to perform the operations of: determining that a communications device is permitted to access a service via the wireless communications network, determining that the communications device does not require access to the service, and in response to determining that the communications device does not require access to the service, transmitting a network restriction indication to an infrastructure equipment, the network restriction indication indicating whether the communications device is permitted to select as a serving cell a cell of the wireless communications network.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN#81.

[2] Holma H. and Toskala A, "LTE for UMTS OFDMA and SC-FDMA based radio access", John Wiley and Sons, 2009.

[3] 3GPP TS 23.502 "3rd Generation Partnership Project; Technical Specification Group Services and System Aspects; Procedures for the 5 G System (5GS); Stage 2 (Release 16)", version 16.4.0

[4] 3GPP TS 38.331 "3rd Generation Partnership Project; Technical Specification Group Radio Access Network; NR; Radio Resource Control (RRC) protocol specification (Release 16)" v. 16.0.0

The invention claimed is:

1. A method of operating a communications device in a wireless communications network, the method comprising:

transmitting a registration request to an infrastructure equipment, the registration request requesting that the communications device be registered for a dynamic service provided via the wireless communications network, the dynamic service including a service which is not covered by a pre-existing agreement between (i) a subscriber and (ii) the wireless communications network or a service provider, receiving via a wireless access interface provided by the infrastructure equipment in a cell of the wireless communications network a registration accept indication sent in response to the registration request, the registration accept indication indicating that the communications device is permitted to be registered for the dynamic service, receiving via the wireless access interface information associated with the dynamic service, after receiving the registration accept indication and the information associated with the dynamic service, determining that the dynamic service is not required based on the information associated with the dynamic service, wherein determining that the dynamic service is not required based on the information includes:

displaying one or more of terms and conditions applicable to the use of the dynamic service to a user of the communications device, and receiving an input from the user indicating that the dynamic service is not required based on the displayed one or more of the terms and conditions; and in response to determining that the dynamic service is not required, transmitting, using a control plane before a user plane connection to a core network is established, a service rejection indication to an entity of the core network indicating that the dynamic service is not required.

2. The method according to claim 1, wherein the information associated with the dynamic service and the indication that the communications device is permitted to be registered for the dynamic service are received within a same message.

3. The method according to claim 1, wherein the information associated with the dynamic service is received within one or more broadcast messages.

4. The method according to claim 1, wherein the input from the user indicates that the one or more of terms and conditions applicable to the use of the dynamic service are not acceptable to the user.

5. The method according to claim 1, wherein the registration request comprises a registration type indication.

6. The method according to claim 1, the method comprising before transmitting the registration request, transmitting a radio resource control (RRC) connection request via the wireless access interface, wherein the registration request is transmitted within a message associated with an RRC connection.

7. The method according to claim 1, the method comprising receiving a network restriction indication, the network restriction indication indicating a category of cells, the category of cells including the cell of the wireless communications network, and selecting a cell in accordance with the network restriction indication.

8. The method according to claim 1, wherein the dynamic service includes a service whose pre-existing agreement may be supplemented before the service is obtained.

* * * * *